Sept. 30, 1958 R. G. FRIEDMAN 2,854,115
PRESS CONTROL
Filed Aug. 4, 1955 5 Sheets-Sheet 3

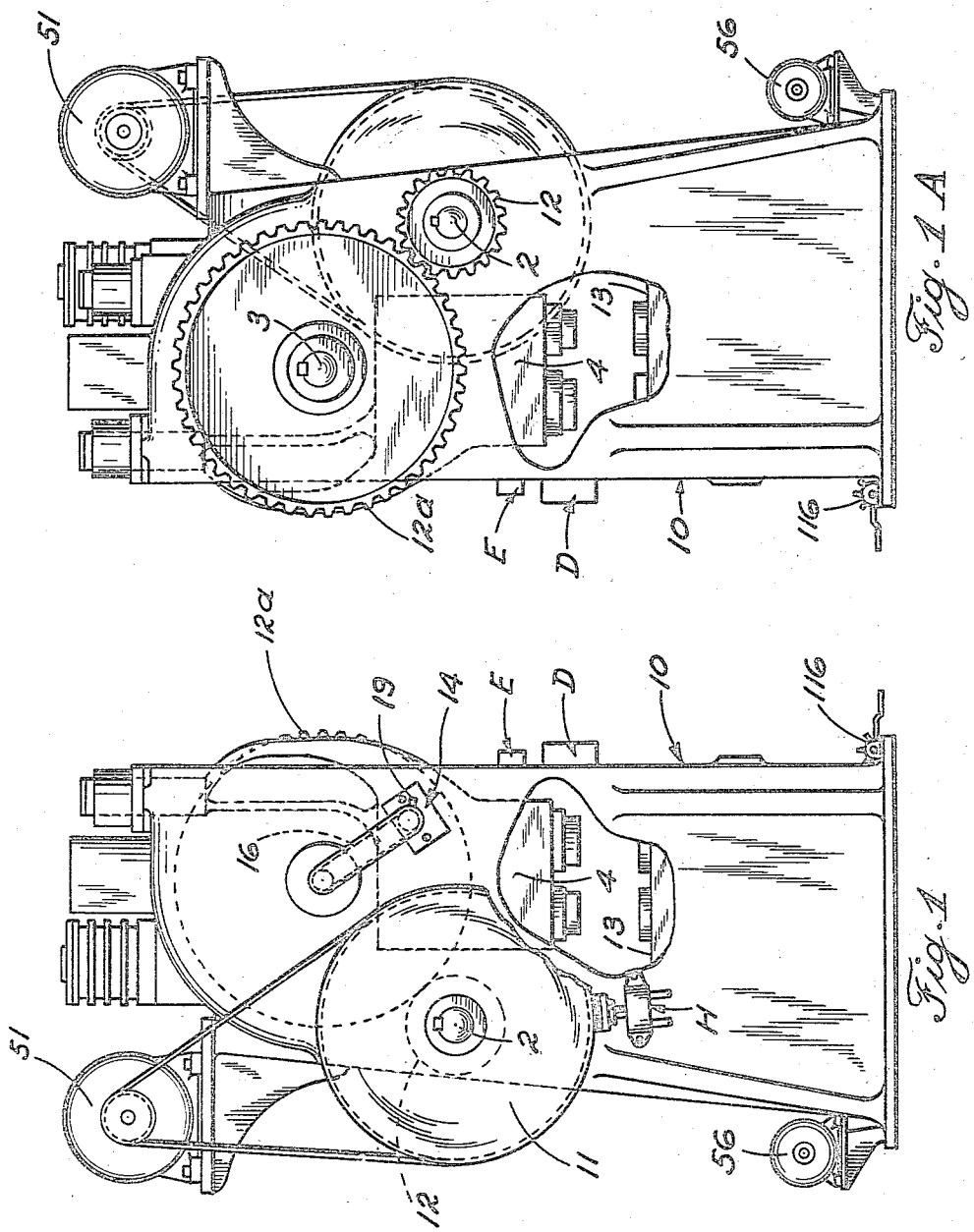

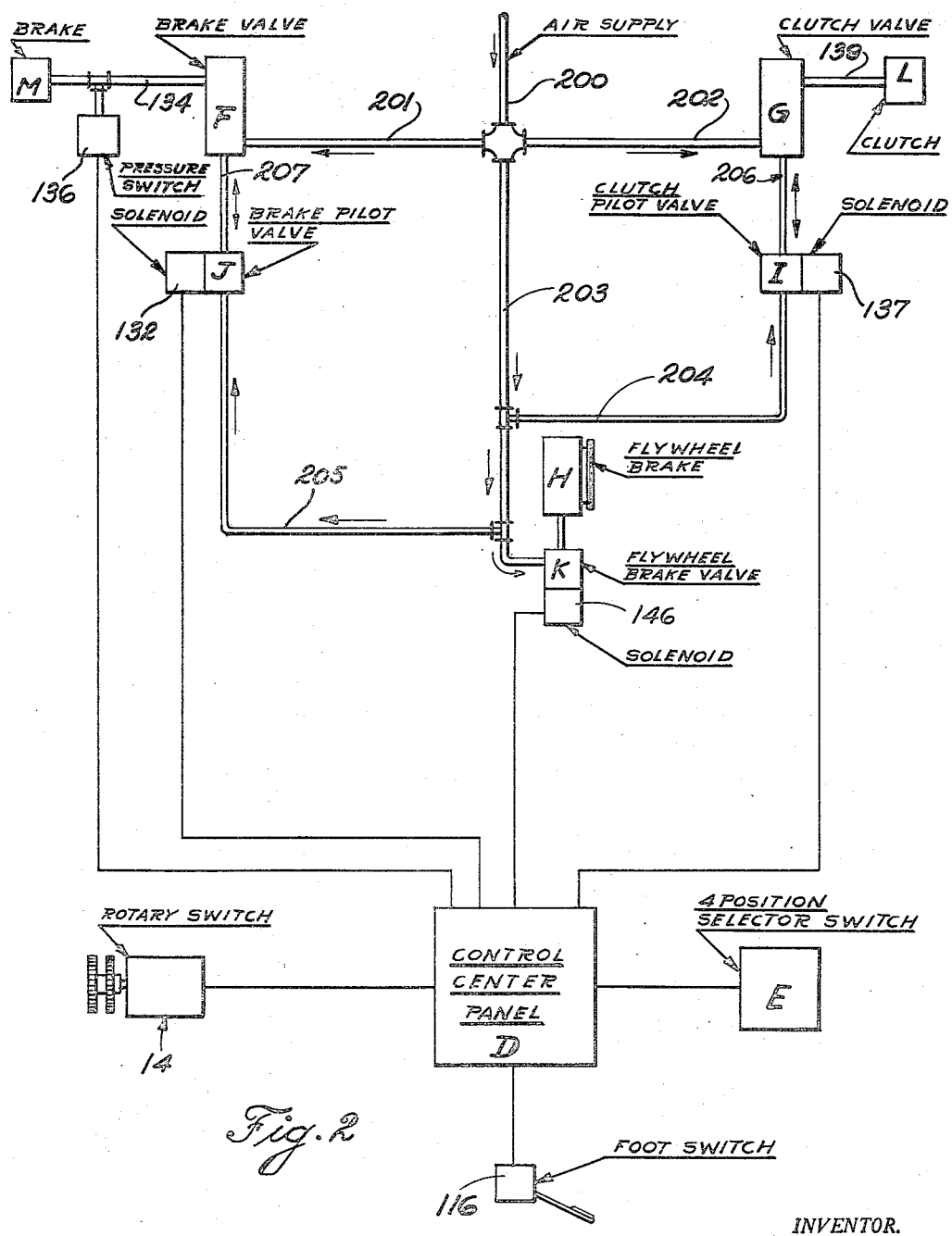

INVENTOR.
ROBERT G. FRIEDMAN
BY
RICHEY, WATTS, EDGERTON & McNENNY
Donald W. Farrington
ATTORNEYS INVENTOR.
ROBERT G. FRIEDMAN.
BY
RICHEY, WATTS, EDGERTON & McNENNY
Donald W. Farrington
ATTORNEYS Sept. 30, 1958  R. G. FRIEDMAN  2,854,115
PRESS CONTROL
Filed Aug. 4, 1955  5 Sheets-Sheet 5
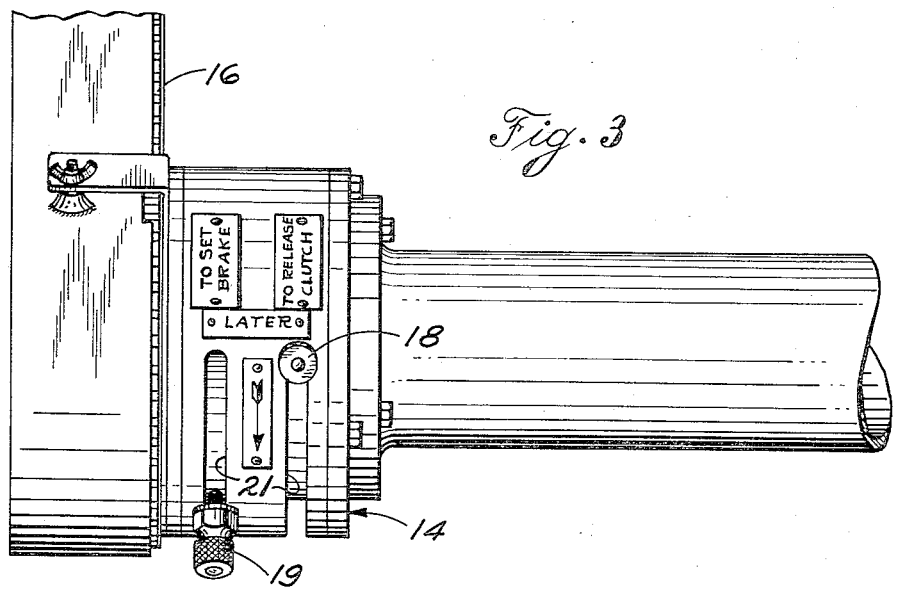
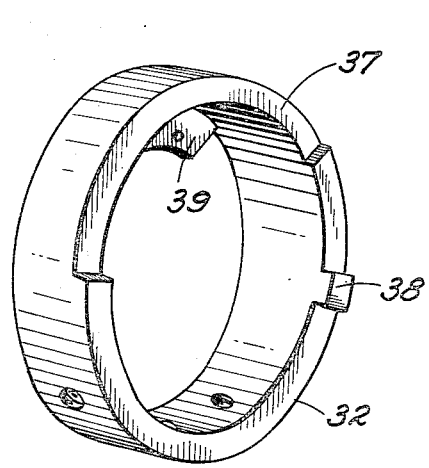
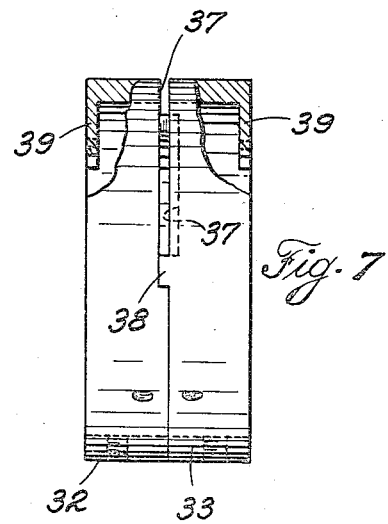
| SELECTOR CONTACT ARRANGEMENT | | | | | | |
|---|---|---|---|---|---|---|
| POS. | MARK | 111 | 112 | 113 | 114 | 63 |
| 1 | FLYWHEEL BRAKE | | | | X | |
| 2 | JOG | | | | | X |
| 3 | ONE SHOT | X | X | | | X |
| 4 | CONT. | X | X | X | | X |
Fig. 9
INVENTOR.
ROBERT G. FRIEDMAN
BY
RICHEY, WATTS, EDGERTON & McNENNY
Donald W. Farrington
ATTORNEYS United States Patent Office 2,854,115
Patented Sept. 30, 1958

2,854,115

PRESS CONTROL

Robert G. Friedman, Tiffin, Ohio, assignor to The National Machinery Company, Tiffin, Ohio, a corporation of Ohio Application August 4, 1955, Serial No. 526,456

4 Claims. (Cl. 192—144)

This invention relates generally to a control for forging machines and more particularly to a control system for use with forging presses and the like.

Forging press controls of the prior art are arranged so that when the press is actuated the machine automatically goes through one cycle of operation starting from the "top-center" position wherein the slide or ram is spaced from the die breast and returning to rest in the same "top-center" position at the completion of each cycle. Generally speaking, cams are mounted on the crank shaft of the press and these cams are utilized to disengage a fluid pressure operated clutch and engage a fluid pressure controlled brake to bring the press to rest at the end of each cycle of operation. Some variations in the cycle are possible in such prior art devices, but they generally require shutting down the machine, blocking the slide in its upper position, venting the fluid pressure from the pipes, and climbing up on the side of the press to loosen and adjust the position of the cam. It is even more difficult in such machines to make major adjustments since they require changing of the cams completely.

For the above reasons it has been a tendency of the operators to adjust the cam so that the clutch remains engaged as long as possible, so that the machine would operate satisfactorily on the maximum load and to leave the adjustment that way even with some overlap between the clutch disengagement and the brake engagement. This resulted in excessive wear and maintenance since it is most desirable to arrange the clutch so that it is engaged for the shortest time possible which is commensurate with the load being worked in the press so that the machine will tend to coast to a stop as it returns to its initial position prior to the application of the brake. If the adjustment is made in this way less power is consumed in the operation of the machine and longer brake life occurs since the brake does not have to absorb as much energy. Overlap between the clutch engagement and brake engagement is also undesirable and results in excessive wear of both clutch and brake elements so it is highly desirable to provide a mechanism wherein it is impossible for overlap to occur.

A control mechanism according to the present invention is arranged so that an adjustment to the machine is possible with the shutdown time completely eliminated. It is also possible in a mechanism according to the present invention to make independent adjustments to both the clutch and brakes so that the most optimum settings for each different work load may be achieved. The control mechanism is also arranged so that it is impossible for an overlap of clutch and brake engagement to occur.

It is an important object of this invention to provide a control mechanism for a forging machine which permits adjustment of the clutch and brake mechanism while the machine is in operation.

It is another object of this invention to provide a control system for cyclically operating rotating machinery which permits great flexibility in adjustment, which adjustment may be made easily and quickly without extended period of shutdown.

It is still another object of this invention to provide a control mechanism for cyclically operating rotating machinery which permits simple adjustment to compensate for changes in the type of operation of the machine.

It is a further object of this invention to provide an electrical control for rotating equipment which control provides complete protection to the machine and dependable operation.

It is a still further object of this invention to provide a control mechanism in combination with a forging press wherein electrical control means are utilized to operate the pneumatic clutch and brake mechanisms.

It is still another object of this invention to provide a control mechanism for a forging press which will automatically operate the press through one cycle of operation if desired and which may be easily adjusted to operate the press continuously while the actuating lever is operated and which permits both forward and reverse jogging of the machine.

Further objects and advantages will appear from the following description and drawings, wherein:

Fig. 1 is a side elevation of a forging press incorporating a control according to this invention;

Fig. 1A is an elevation of the forging machine on the side opposite Fig. 1;

Fig. 2 is a schematic drawing showing the various controls for the forging machine shown in Fig. 1;

Fig. 3 is a side view of the rotary switch control station utilized to separately adjust the clutch and the brake of the forging press;

Fig. 6 is a perspective view of the adjustment ring used in the rotary switch;

Fig. 7 is a partial cross section of the two adjustment rings as they are positioned within the rotary switch;

Fig. 9 is a table of the selector switch contact arrangement utilized to change the mode of operation of the press.

Figure 4:
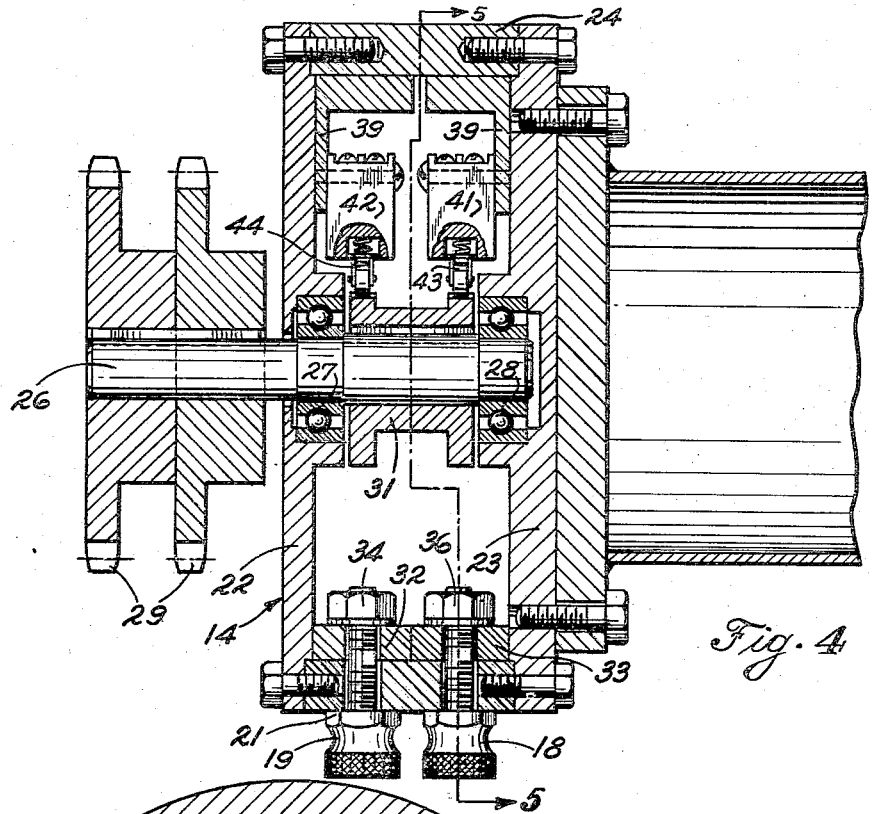
Fig. 4 is a cross section of the rotary switch shown in Fig. 3.

A control mechanism according to this invention is adapted for use with a forging machine including a fly wheel and a crank shaft adapted to be operated in a cyclic manner, a clutch operably connecting the shaft and fly wheel, and a brake adapted to limit the rotation of the shaft. The control mechanism includes clutch control means operably connected to the clutch adapted to disengage the clutch, brake control means operably connected to the brake adapted to engage the brake and actuating means connecting the shaft and control means, the actuating means being synchronized with the angular displacement of the shaft. Each of the control means is operably adjustable so as to adjust the operation of the clutch and brake relative to the angular position of the shaft and means are provided to prevent the clutch and brake from being engaged simultaneously.

For a clearer understanding of the invention reference should be made to the drawings wherein Fig. 1 shows the fly wheel side of a forging press incorporating a control according to this invention. The other side of the press is shown in Fig. 1A. The press 10 is provided with a fly wheel 11 mounted on a countershaft 2 which extends across the frame of the press and drives the gears 12 and 12a. The machine also provides a crank shaft 3 which may be operably connected to the fly wheel by a clutch interposed between the fly wheel 11 and shaft 2. A brake is arranged to limit the rotation of the crank shaft 3.

The crank shaft 3 is connected to the slide or ram 4 which reciprocates vertically from a "top-center" position spaced from the die breast 13 to a bottom center position against the die breast 13. The main motor 51 for driving the machine is belted to the fly wheel 11 and a rim of the fly wheel is provided with a brake H. A lubricant pump motor 56 is mounted on the back of the press and a foot switch 116 is on the operator's side. It will be understood that the forging press per se may be of a popular design such as the machines shown in United States Patents No. 2,210,227 or 2,389,425 and that the various elements of the press itself except as to their specific co-operation with the control mechanism form no essential part of this invention.

The general mode of operation of the press constructed according to the present invention may be understood by reference to Fig. 2 wherein fluid pressure, such as compressed air, is introduced through line 200. The air is distributed through a fitting to line 201 leading to a brake valve F, line 202 leading to a clutch valve G, and line 203 leading through a fly wheel brake valve K to a fly wheel brake H. Air from line 203 is directed through branch 204 to a clutch pilot valve I and through branch 205 to a brake pilot valve J. Line 203 terminates in a fly wheel brake valve K. The branch 204 may be referred to as a pilot line in that when the clutch valve I is opened it serves through conduit 206 to actuate valve G so as to direct air from line 202 through the valve G and line 139 to the air operated clutch L. Similarly, the branch 205 may be referred to as a pilot line in that when the brake pilot valve J is opened, air is directed through line 207 to actuate the brake valve F so that valve F admits air pressure from line 201 through the brake valve F into the brake line 134 and thus actuates the brake M.

It will be understood as this description proceeds, that the clutch pilot valve I and the brake pilot valve J are opened and closed by a solenoid, and that the sequential operation of the clutch and brake by fluid pressure is determined by an electrical circuit including the solenoids for the pilot valves I and J. The line 134 leading from the brake valve F to the brake M is provided with a pressure responsive switch 136 so arranged in the electric circuit controlling the clutch pilot solenoid 137 that the clutch will not be operated until a predetermined pressure has been obtained in line 134. The electrical control for the brake and clutch valves includes a rotary switch 14, a control center panel D and a four-position selector switch E and foot-operated switch 116. The rotary switch 14 is driven in synchronism with the crank shaft of the press which in turn is started and stopped by the clutch L and the brake M. The four-position selector switch E is connected to the control center panel D so as to determine whether or not the press should be operated in either of four ways, (a) continuusly, or (b) a one revolution cyclic fashion, or (c) jogged through portions of a cycle, or (d) that the fly wheel brake should be applied.

The general schematic arrangement of the various control elements is shown in Fig. 2. It will be understood that one portion of the control mechanism for the forging press is pneumatically operated and another portion is electrically controlled. Fundamentally the electrical controls are used to operate the pneumatic portion which in turn provides the direct operation of the clutch and brakes for the forging press. In the electrical portion of the control, a rotary switch 14 is connected to the press drive by a chain device in such a manner that the switch 14 is synchronous with the crank shaft rotation and the angular position of the rotary switch is determined by the angular position of the crank and slide of the press. This rotary switch 14 is electrically connected to the control panel D which contains most of the electrical circuit of the system. A four-position selector switch E is provided which is electrically connected to the central control panel D and this switch E is utilized to determine the mode of operation of the press. For example, adjustments of the four-position selector switch E in one position engages the fly wheel brake H. Another position of the selector switch E is used when jogging is desired. Still another position determines the operation of the machine when single cyclic operation is desired and the fourth and last position of the selector switch operates the controls so that the press will operate continuously as long as the foot switch is depressed.

The various clutch L and brakes H and M of the press are pneumatically operated and are controlled by solenoid valves which are electrically connected to the control panel D. In order to disengage the crank shaft brake M, electric power is supplied to the brake pilot valve solenoid which supplies air pressure to the brake valve F. The brake valve F when actuated by the brake pilot valve J in turn supplies pneumatic pressure to the brake mechanism M thereby releasing the brake. The clutch L is controlled by a clutch pilot valve solenoid which in turn actuates the clutch valve G and supplies pneumatic pressure to the clutch L to engage the clutch when operation is to commence. When the machine is to remain idle, however, the fly wheel brake H is engaged by the fly wheel brake valve solenoid K. In order to insure that the crank shaft brake M is completely disengaged before the clutch L engages, a pressure switch 136 is connected to the pressure line 134 leading from the brake valve F to the brake M and also to the control panel D in such a manner that clutch engagement will not occur prior to the time when full operating pressure is applied to the brake M.

Figure 5:
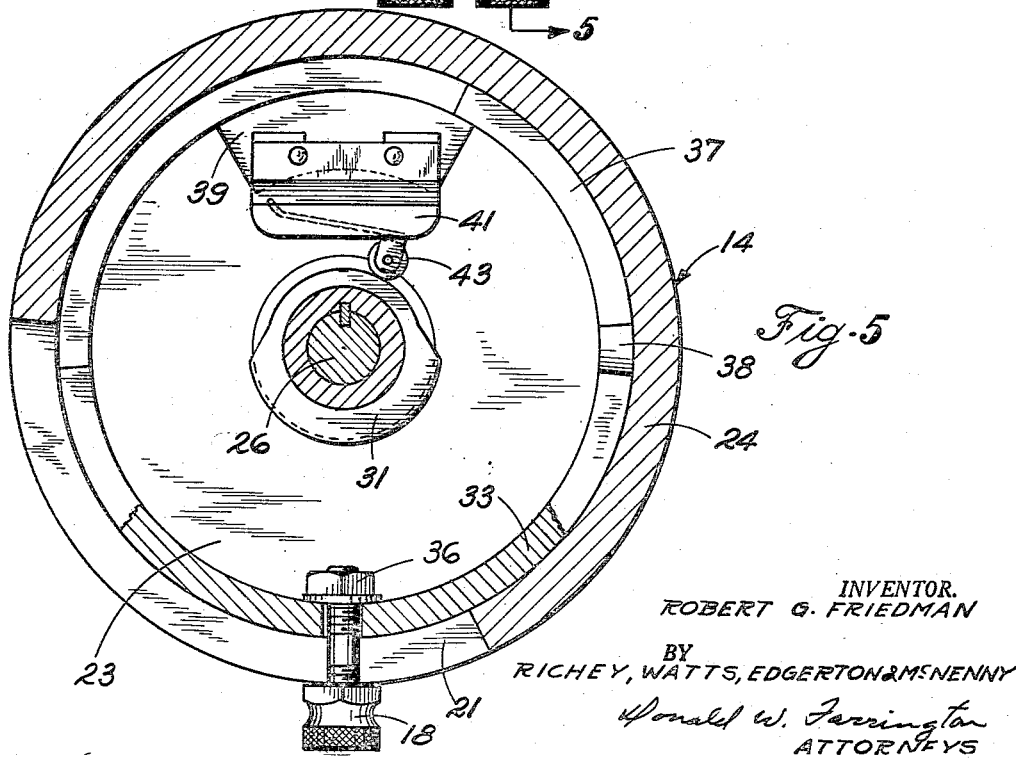
Fig. 5 is a cross section view of a rotary switch taken along 5—5 of Fig. 4.

The rotary switch 14 is mounted on the fly wheel side of the frame of the press convenient to the operator and is connected by a chain drive 16 to the crank shaft 13. The rotary switch 14 is shown in more detail in Figs. 3 to 7. A clutch control knob 18 is provided on the rotary switch for an adjustment of the operation of the clutch and a brake control knob 19 is provided for the adjustment of the brake. These two control knobs 18 and 19 may be independently adjusted along the arcuate slots 21 to any desired position. Reference is made to Figs. 4 and 5 for the details of the rotary switch construction. The frame of the rotary switch is made up of a first side plate 22 and a second side plate 23 which are bolted to the housing 24 to form a cylindrical hollow housing assembly. The cam shaft 26 is journaled in the side plates for rotation and is arranged to project beyond the housing so that the chain sprockets 29 may be mounted thereon. A cam 31 is keyed on that portion of the shaft 26 within the housing for rotation therewith. This cam, in the preferred embodiment, is formed with two similar camming surfaces; however, a single broad camming surface may be utilized.

A brake adjustment ring 32 and a clutch adjustment ring 33 are adapted to fit within the frame 24 and abut against the side plates 23 and 22 respectively. These adjustment rings are rotationally movable within the frame but are provided with lock bolts 34 and 36 respectively on which the clutch knobs and brake knobs 18 and 19 are mounted. These lock bolts extend through the slots 21 in the frame and provide means which with the knobs 18 and 19 permit locking the rings in any desired position within the frame. Reference should be made to Fig. 6 for the details of the adjustment rings. Each ring is formed with a recessed portion 37 and a projecting portion 38. The rings themselves are similar in shape but are turned 180° relative to each other so that the projecting portion 38 on one ring projects into the recessed portion 37 of the other ring. The projecting portion 38 and the recessed portion 37 are arranged so that the rings may be adjusted relative to each other through a substantial range as determined by the angle of the recess. This is utilized to prevent adjustment of the mechanism wherein the clutch and brake could be engaged simultaneously. It is apparent that even though independent adjustment may be provided through a substantial range represented by the radial extent of the recess 37, the projecting portions prevent rotational adjustment of one ring relative to the other beyond a certain point, this point is determined by the position of one ring with respect to the other.

Each ring is provided with an inwardly extending flanged portion 39 upon which micro-switches are mounted as best seen in Fig. 5. A clutch micro-switch 41 is mounted on the clutch ring 33 and a brake micro-switch 42 is mounted on the brake ring 32. The clutch micro-switch 41 is provided with a cam follower 43, and the brake micro-switch 41 is provided with a cam follower 44. The cam follower, micro-switch and cam are arranged so that as the shaft 26 and the cam 31 rotate, the micro-switches are opened and closed by the cam followers. The particular phase relationship between the opening and closing of the micro-switches is, of course, dependent upon the relative position of the micro-switches and the housing 24.

Figure 8:
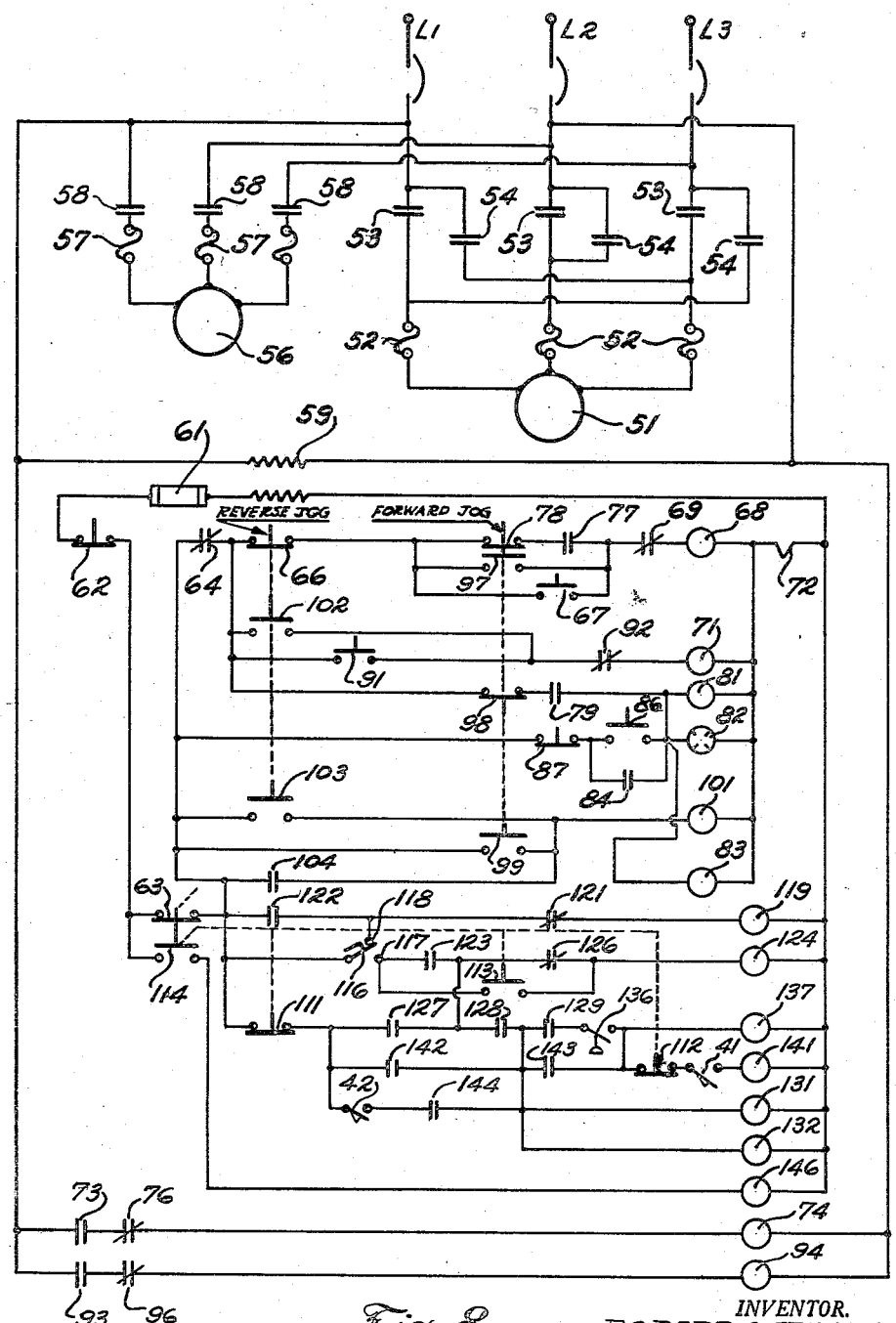
Fig. 8 is an electrical circuit diagram for the machine control made according to this invention.

Fig. 8 shows the electrical circuit of the control system according to this invention which includes a three phase line voltage source; L1, L2 and L3. The drive motor 51 of the press is adapted to be powered by the line voltage and is protected by overload relays 52. Each of the lines of the power source are connected to the drive motor 51 of the press through either the motor contactor 53 for forward drive or the motor contactor 54 for reverse drive. The lubricating motor 56 is also connected to the line power through overloads 57 and this motor is used to supply power for the forced lubricating system of the press. In this case the contactors 58 are utilized for connecting the motor to the line power.

The control circuit also includes a low voltage control circuit connected to the line voltage by a step-down transformer 59 through a protective fuse 61. A low voltage control circuit supplies the various elements and connections necessary for the starting of the motor, the operation of the clutch and brakes, and various elements used to insure protection of the press mechanisms. From the fuse 61 the power is supplied to the control circuit through the normally closed stop switch 62 and the contact 63. From there the power passes to the motor starting and protective phase of the control circuit through the normally closed contact 64 to the normally closed contact 66 of the reverse jog switch to the normally open forward run switch 67. When the forward run starting switch 67 is closed the forward control relay 68 for forward motion is energized through the normally closed contact 69 of the control relay 71 for rearward motion and the overload 72. When the control relay for forward motion is energized the contact 73 is closed, causing the motor relay 74 for forward motion to be energized through the normally closed contact 76. This closes the contacts 53 and starts the drive motor 51. At the same time the normally open contacts 77 which are operated by the motor relay 74 are closed to provide a hold circuit parallel to the forward run switch 67 through the normally closed contacts 78 of the forward jog switch.

The energizing of the control relay 68 also closes the normally open contact 79 which in turn energizes the lubricating motor control relay 81, the green light 82 and the lubricating motor relay 83. This in turn closes the contact 58 and starts the lubrication motor 56. The normally open contacts 84 on the lubricating control relay 81 are also closed at this time to provide a hold circuit for the lubricating motor controls.

If it should be desired to operate the lubricating motor 56 without starting the drive motor 51 it is possible by closing the normally open start switch 86 which provides a path for the power parallel to the contacts 79. However, it should be noted that whenever the drive motor 51 is running steadily the lubricating motor 56 is operated by the contacts 79. A stop switch 87 may be utilized to shut off the lubricating motor 56; however, it is arranged so that if the drive motor is operating in the normal manner opening of the stop switch 87 will not affect the stoppage of the lubricating motor. This insures that so long as the press is operating proper lubrication will be supplied even if the controls are manipulated in an improper manner.

In order to start the drive motor in the reverse direction a normally open reverse switch 91 may be closed which energizes the control relay 71 for reverse motor drive through the normally closed contacts 92. When the control relay 71 for reverse drive is energized the contactor 93 energizes the motor relay 94 for reverse drive through the normally closed contacts 96. This in turn closes the reverse contactors 54, energizing the drive motor 51. Reverse operation will only continue as long as the reverse switch 91 is closed since no hold circuit is provided.

In order to prevent the possibility of shorts between the forward drive and the reverse drive of the drive motor 51 several safety precautions are taken. When the drive motor 51 is energized in a forward direction by the motor relay 74 the normally closed contact 96 which is in the circuit of the motor relay 94 is opened. This is accomplished by providing the contacts 96 which is mechanically connected to and operated by the motor relay 74. The corresponding normally closed contact 76 is operated by the motor relay 94 and opens, thereby preventing the energizing of the motor relay 74 for forward motion when the motor relay 94 for rearward motion is energized. Protection is also provided by the normally closed contact 69 which is operated by the control relay 71 to prevent the energizing of the control relays 68 and 71 simultaneously, and by the corresponding normally closed contacts 92 which are operated by the control relay 68. It is, therefore, impossible for either the control relay 68 and 71 to be energized simultaneously or for the motor relays 74 and 94 to be energized simultaneously.

When it is desired to jog the press the drive motor is not operated continuously but is merely energized for a predetermined time to bring the fly wheel up to a slow rate of rotation. To accomplish this purpose either the forward jog or the rearward jog switches are used. To jog the motor forward the forward jog switch is depressed which opens the normally closed switch 78, closes the normally open switch 97, opens the normally closed switch 98 and closes the normally closed switch 99. These various switches on the forward jog are mechanically connected so that merely pressing the forward jog switch operates each of the switches 78, 97, 98 and 99. The closing of the switch 97 energizes the control relay 68 for forward motion which in turn energizes the motor relay 74 for forward motion and starts the motor 51 in a forward direction. At the same time the opening of the switch 98 prevents the automatic starting of the lubrication motor by preventing the control relay 81 from being energized. The closing of the switch 99 energizes the time pick-up relay 101. The closing of the normally open switch 103 energizes the time relay 101 which operates to limit the amount of time the reverse operation of the motor is energized. When the predetermined time has elapsed again the normally closed contacts 64 would open deenergizing the control relay 71 and the motor relay 94. The function of the time relay 101 in the reverse jogging is the same as described above in connection with the forward jogging. The timer relay 101 is preferably a motor driven timer having an adjustable "on" and "off" cycle which operates the contacts 64 and 104. During the "on" portion of the cycle the contact 64 is closed and the contact 104 is open so as to make the control circuit operable. When, however, the contact 103 or 99 is closed the motor timer relay 101 will advance through the "on" portion of the cycle—usually about 3 seconds. At this point in the cycle the contact 64 opens making a push button control inoperable. Contact 104 also closes at this point in the cycle and forms a closed circuit for the motor driving the timer relay 101 to drive the same through the "off" portion of the cycle—preferably about 10 seconds. This operation will return the timer contacts 64 and 104 to their original position as at the start of the "on" portion of the cycle.

The portion of the control circuit discussed thus far controls the drive motor 51 and the lubrication motor 56 and the following portion of the circuit is directed to the control of the clutch and brake mechanism. The selector switch E shown in Fig. 2 is utilized to determine the mode of operation of the forging press. The table shown in Fig. 9 discloses the arrangement of the various contacts of the selector switch when the switch is set in the various positions corresponding to the different modes of operation. The contacts of the selector switch appear in the circuit diagram of Fig. 8 and are shown in the positions assumed when the selector switch is set in position 3 of Fig. 9, namely, the one shot position.

The selector switch includes contacts 63, 111, 112, 113 and 114. When the selector switch is set in the one shot position contact 63 is closed as is contacts 111 and 112, and contacts 113 and 114 are open. Prior to the initiation of the operation of the machine the foot switch 116 is in the upper position as shown in the circuit diagram. This foot switch 116 is designed so that when it is depressed by the operator to operate the machine the foot switch moves down to the lower contact 117 and opens the upper contact 118. Before the foot switch is depressed the one shot relay 119 is energized through the closed contact 63, the foot switch 116 and the normally closed contact 121. The normally open contacts 122 and 123 are operated by the one shot relay 119. It is apparent that the normally open contact 122 is thereby closed prior to the depressing of the foot switch 116 and this contact serves as a hold circuit for the one shot relay 119.

When the foot switch 116 is depressed closing the lower contact 117, the brake relay 124 is energized through the contacts 123 which is closed by the one shot relay 119 and the normally closed contact 126. Operated by the brake relay 124 are the normally open contacts 127, 128 and 129, so when the brake relay 124 is picked up, power is supplied through the closed contacts 111, 127 and 128 to the brake sequence relay 131 and the brake solenoid 132 for brake pilot valve J. As long as the foot switch 116 is depressed a parallel path is also provided through the foot switch 116 the contacts 123 and 128. When the brake solenoid valve J is operated the pneumatic pressure is supplied to the brake valve F shown in Fig. 2 and in turn to the conduit 134 leading to the crank shaft brake mechanism M. When sufficient pneumatic pressure is present in the conduit 134 to insure that the brake is released the pressure switch 136 closes. At this time the clutch solenoid 137 is energized through the contact 129 and the pressure switch 136. This causes pneumatic pressure to be supplied to the clutch valve G shown in Fig. 2 and in turn to the clutch L through the pressure conduit 139 thereby engaging the clutch. By providing the pressure switch 136 in the clutch circuit, the possibility of the clutch engaging prior to the complete disengagement of the brake is eliminated. At this time the forging press starts to operate through one cycle and the slide 4 moves toward the die breast 13 by virtue of the connection of the crank shaft 3 to the fly wheel 11 through the clutch M.

As the press operates the rotary switch 14 shown in Figs. 3 through 7 begins to function causing the clutch micro-switch 41 to be cammed from the normally open position to the closed position. The clutch micro-switch 41 energizes the clutch relay 141. Operated by the clutch relay 141 are the normally open contacts 142 and 143 and the normally closed contacts 121 and 126. As soon as the clutch relay is energized it is, therefore, apparent that the one shot relay 119 and the brake relay 124 are de-energized by the opening of the normally closed contacts 121 and 126 respectively. The de-energization of the brake relay 124 results in the opening of the contacts 127, 128 and 129 and this would result in a de-energization of the clutch and brake pilot valves I and J if it were not for the fact that the normally open contacts 142 and 143 are closed. Since the contacts 142 and 143 provide a parallel circuit around the contacts 127, 128 and 129, it is necessary that an overlap be provided between the contacts 142 and 143, and 121 and 126. This overlapping insures that the normally open contacts 142 and 143 are closed before the normally closed contacts 121 and 126 are opened thereby providing continuity of the operation.

The brake micro-switch 42 is also closed by the rotary motion of the cam 31 of the rotary switch 14 and this results in a second parallel circuit for the brake sequence relay 131 and the brake solenoid valve 132 through the normally open contact 144 which is closed by the operation of the brake sequence relay 131. When the press and the rotary switch 14 are rotated to a point where the clutch micro-switch 41 is allowed to open by the cam 31 the clutch relay 141 is de-energized, thereby opening the normally open contacts 142 and 143 and closing the normally closed contacts 121 and 126. The closing of the contact 121 will not, however, cause the one shot relay to be picked up unless the foot switch 116 is returned to its upper position and, of course, unless the one shot relay is energized the normally open contact 123 prevents the brake relay 124 from being energized. It is, therefore, apparent that the machine will not recycle because the one shot relay 119 cannot be energized until the foot switch 116 is released and if the foot switch 116 is released the brake relay 124 cannot be energized. The opening of the clutch micro-switch, therefore, functions to de-energize the clutch solenoid 137, thereby releasing the clutch L.

When the machine returns to its starting position with the slide 4 at "top-center" position the brake micro-switch 42 is allowed to open by the cam 31. This, of course, de-energizes the brake sequence relay 131 and the brake solenoid 132 which closes the brake valve F and in turn applies the brake M bringing the machine to rest at its original position. The setting of the brake ring 32 and the clutch ring 33 in the rotary switch 14 determines the angular position of the machine at the time the brake micro-switch 42 and the clutch micro-switch 41 open. By adjusting the clutch ring 33 angularly relative to the rotary switch 14, the position of the machine at the time the clutch dis-engages is controlled. Also, by adjusting the brake ring 32 relative to the rotary switch 14 the angular position of the machine when the brake is applied is easily adjusted. The projecting portion 38 on the adjusting rings 32 and 33 prevent the adjustment of the two rings relative to each other to a position where the clutch micro-switch 41 could be closed after the brake micro-switch 42 opens. This insures that the clutch and brake will be adjusted within a range wherein the clutch and brake cannot be engaged simultaneously.

When the selector switch is moved to the position for continuous running the contact 113 is closed. The effect of closing the contact 113 is to by-pass the one shot relay 119 and this permits the operation of the press to continue so long as the foot switch 116 is depressed. By referring to the circuit diagram of Fig. 8, it is apparent that when the contact 113 is closed the brake relay 124 will remain energized so long as the foot switch 116 is in engagement with the lower contact 117. The machine will, therefore, continue to operate until the foot switch 116 is released. If, however, the foot switch 116 is released at any time when the machine is in a position other than its normal position of rest with the slide spaced from the die breast the brake relay 124 and the clutch relay 141 will cause the clutch and the brake to function in the normal manner until the machine reaches its normal position of rest. It is therefore, impossible during continuous running to stop the machine in any position other than its normal "back-center" or starting position.

When the selector switch E is set at the jog position the contacts 111, 112, 113 and 114 are open and the contact 63 is closed. Under these conditions when the foot switch 116 is in its upper position the one shot relay 119 is energized. By depressing the foot switch 116 the circuit is closed to the brake relay 124 which in turn causes the brake sequence relay 131 and the brake solenoid valve 132 to be energized releasing the brake. When the pressure switch 136 closes the clutch solenoid 137 is energized causing the clutch L to be engaged. Since the contacts 111 and 112 are both open during this form of operation the hold circuits do not function so the clutch will remain engaged and the brake remains disengaged only so long as the foot switch 116 is depressed. It is, therefore, apparent that the clutch will be disengaged and the brake engaged at any time when the foot switch 116 is released, bringing the machine to rest in any desired position. It is during this jogging of the machine that the forward jog switch and reverse jog switches are used and the fly wheel is operating at a slow speed.

When the machine is to be shut off completely the selector switch E should be moved to the position for fly wheel brake at which time the contact 114 is closed and the contacts 63, 111, 112 and 113 are open. The opening of the contact 63 prevents the motor 51 from operating and also prevents the clutch L and brake M from being actuated. The closing of the contact 114 causes the fly wheel brake solenoid 146 to be actuated thereby opening valve K and setting the fly wheel brake H. At any time when it is desired to shut down the machine without applying the fly wheel brake it is merely necessary to open the stop switch 62 which shuts off the drive motor 51 and the lubricating motor 56.

It is apparent that by providing the combination of the electrical circuit described above and the pneumatic controls, a forging press can be operated in any manner desired and the clutch and brakes are protected against accidental manipulation of the controls. It is also apparent that the rotary switch according to this invention in conjunction with the various other controls such as the selector switch and the like, make it possible to adjust the timing of the clutch and brake operation with ease and dispatch completely eliminating the shutdown time necessary in prior art devices. By making the adjustments of the machine convenient it is much more likely that the clutch and brake will be properly adjusted for the particular job for which it is currently being used.

Those skilled in the art will appreciate that all of the adjustments and changes in mode of operation of the press are conveniently made by the operator according to this invention. The controls prevent damage to the press by inexperienced or careless operation of the manual controls. Preferably the press is adjusted by first determining the start of engagement and the duration of the engagement of the clutch. The period of clutch engagement is preferably for the shortest possible time commensurate with the work load imposed on the press, and the clutch ring 33 is positioned so that there will be a tendency for the machine to coast to a stop as the header slide approaches its maximum "back-center" position. This is effected by repeatedly tripping the machine and observing the ram as it moves away from the die breast. Thereafter the time of application and the duration of the brake application is determined by moving the brake ring 32. The movement of the brake ring 32 relative to the clutch ring 33 is limited by reason of the interengaging lugs and grooves on the clutch and brake rings. The brake ring 32 is then clamped in position and will operate to hold the header slide in its maximum "back-center" position at the end of each cycle. It will be appreciated that the over-all speed of press operation may be improved by maintaining an adjustment of the clutch over a period of time in excess of the time actually required for the particular work load imposed on the header slide.

Although a preferred embodiment of this invention is illustrated, it will be realized that various modifications of the structural details may be made without departing from the mode of operation and the scope of the invention as set forth in the following claims.

What is claimed is:

1. In a forging press having a crank shaft, a power unit, a fluid pressure operated clutch between the crank shaft and said power unit, a fluid pressure operated brake for the crank shaft, a source of fluid pressure, a brake valve to admit fluid pressure to said brake, a brake conduit connecting said brake valve and brake, a clutch valve to admit fluid pressure to said clutch, a solenoid to actuate said brake valve, a solenoid to actuate said clutch valve, a pressure responsive switch in said brake conduit, electric circuit means for said clutch and brake solenoids including said pressure responsive switch whereby clutch valve operation is effected in response to a predetermined fluid pressure in said brake conduit.

2. In a forging press having a crank shaft, a power unit, a fluid pressure operated clutch, a fluid pressure operated brake, a source of fluid pressure, a brake valve to admit fluid pressure to said brake, a brake conduit connecting said brake valve and brake, a clutch to admit fluid pressure to said clutch, a solenoid to actuate said brake valve, a solenoid to actuate said clutch valve, pressure responsive means in said brake conduit, electric circuit means for said clutch and brake solenoids including a switch operated by said pressure responsive means whereby clutch valve operation is effected in response to a predetermined fluid pressure in said brake conduit.

3. A forging press having a fluid pressure actuated clutch and brake, solenoid valves and fluid pressure conduits for admitting fluid pressure to the clutch and brake, a crank shaft, a cam shaft mounted for rotation on the press frame, means to connect the crank shaft and the cam shaft for synchronous rotation, control means for said solenoid valves including a brake ring mounted on the frame concentric of the cam shaft for limited arcuate movement with respect to said cam shaft, a clutch ring mounted on the frame adjacent said brake ring for limited arcuate movement with respect to the frame and with respect to said brake ring, interengaging means on said clutch and brake rings to limit the arcuate movement of one ring with respect to the other, a cam on said cam shaft within said rings, each of said rings having a movable switch member extending into the rotational path of said cam, electric circuit means including said switches and said solenoid valves and clamping means to hold said rings in predetermined adjusted position to maintain the sequential operation of the clutch and brake.

4. A forging press having a fluid pressure actuated clutch and brake, solenoid valves and fluid pressure conduits for admitting fluid pressure to the clutch and brake, a crank shaft, a cam shaft mounted for rotation on the press frame, means to connect the crank shaft and the cam shaft for synchronous rotation, control means for said solenoid valves including a foot operated switch, a brake ring mounted on the frame concentric of the cam shaft for limited arcuate movement with respect to said cam shaft, a clutch ring mounted on the frame adjacent said brake ring for limited arcuate movement with respect to the frame, interengaging lugs and grooves on said clutch and brake rings to limit the arcuate movement of one ring with respect to the other, a cam on said cam shaft within said rings, each of said rings having a movable switch member extending into the rotational path of said cam, electric circuit means including said switches and said solenoids and clamping means to hold said rings in predetermined adjusted position to control the sequential operation of the clutch and brake in response to operation of said first-named switch.

References Cited in the file of this patent

UNITED STATES PATENTS

| | | |
|---|---|---|
| 2,065,820 | Mellon | Dec. 29, 1936 |
| 2,454,882 | Oakley | Nov. 30, 1948 |
| 2,464,944 | Rosche | Mar. 22, 1949 |
| 2,525,711 | Naylor | Oct. 10, 1950 |
| 2,559,195 | May | July 3, 1951 |
| 2,571,818 | Blodgett | Oct. 16, 1951 |